US010704692B1

(12) United States Patent
Tones et al.

(10) Patent No.: US 10,704,692 B1
(45) Date of Patent: Jul. 7, 2020

(54) FLOODED METALLIC BEARING ISOLATOR

(71) Applicant: Garlock Sealing Technologies, LLC, Palmyra, NY (US)

(72) Inventors: Christopher Tones, Palmyra, NY (US); Christopher Fink, Palmyra, NY (US)

(73) Assignee: Garlock Sealing Technologies, LLC, Palmyra, NY (US)

( * ) Notice: Subject to any disclaimer, the term of this patent is extended or adjusted under 35 U.S.C. 154(b) by 0 days.

(21) Appl. No.: 15/963,021

(22) Filed: Apr. 25, 2018

Related U.S. Application Data

(60) Provisional application No. 62/490,472, filed on Apr. 26, 2017.

(51) Int. Cl.
*F16J 15/3264* (2016.01)
*F16J 15/447* (2006.01)
*F16C 33/80* (2006.01)

(52) U.S. Cl.
CPC ......... *F16J 15/3264* (2013.01); *F16C 33/805* (2013.01); *F16J 15/4474* (2013.01); *F16J 15/4478* (2013.01)

(58) Field of Classification Search
CPC .. F16J 15/3256; F16J 15/4474; F16J 15/4478; F16J 15/3264; F16C 33/80; F16C 33/805
See application file for complete search history.

(56) References Cited

U.S. PATENT DOCUMENTS

| 2,014,859 | A | | 9/1935 | Mitchell, Jr. |
| 3,192,942 | A | | 7/1965 | Manor et al. |
| 3,602,559 | A | | 8/1971 | Hirschler |
| 3,923,125 | A | | 12/1975 | Rosenthal |
| 4,053,163 | A | | 10/1977 | Vegella |
| 4,070,150 | A | | 1/1978 | Katz et al. |
| 4,166,606 | A | | 9/1979 | Kawolics et al. |
| 4,277,072 | A | * | 7/1981 | Forch ............... F16J 15/164 |
| | | | | 277/404 |

(Continued)

FOREIGN PATENT DOCUMENTS

DE 29715911 U1 2/1999
EP 1962001 A1 8/2008

(Continued)

OTHER PUBLICATIONS

International Search Report for PCT Application No. PCT/US2003/030625, dated Feb. 11, 2004, 2 pages.

(Continued)

*Primary Examiner* — Nicholas L Foster
(74) *Attorney, Agent, or Firm* — Perkins Coie LLP

(57) ABSTRACT

A bearing isolator capable of operating under flooded conditions is disclosed. The bearing isolator can include a stator, a rotor, a unitizing element and a sealing element, the stator and rotor form a cavity in which the unitizing element is disposed, and features of the unitizing element with features of the stator and rotor to ensure the stator and rotor stay together while still maintaining a gap between the two components to avoid metal on metal contact. The sealing element resides against a surface of the stator and includes a radially-inward extending lip seal that rides against a running surface of the rotor for improved sealing.

1 Claim, 2 Drawing Sheets

(56) References Cited

U.S. PATENT DOCUMENTS

| | | |
|---|---|---|
| 4,466,620 A | 8/1984 | Orlowski |
| 4,484,754 A | 11/1984 | Ballard |
| 4,541,744 A | 9/1985 | Lederman |
| 4,679,801 A | 7/1987 | Poloni |
| 4,706,968 A | 11/1987 | Orlowski |
| 4,743,034 A | 5/1988 | Kakabaker et al. |
| 4,832,350 A | 5/1989 | Orlowski |
| 4,852,890 A | 8/1989 | Borowski |
| 4,863,177 A | 9/1989 | Rockwood et al. |
| 4,890,941 A | 1/1990 | Calafell, II et al. |
| 4,989,883 A | 2/1991 | Orlowski |
| 5,024,451 A | 6/1991 | Borowski |
| 5,069,461 A | 12/1991 | Orlowski |
| 5,074,567 A | 12/1991 | Orlowski |
| 5,078,410 A | 1/1992 | Warman et al. |
| 5,137,049 A | 8/1992 | Orlowski |
| 5,158,304 A | 10/1992 | Orlowski |
| 5,161,804 A | 11/1992 | Orlowski et al. |
| 5,163,692 A | 11/1992 | Schofield et al. |
| 5,174,583 A | 12/1992 | Orlowski et al. |
| 5,221,095 A | 6/1993 | Orlowski |
| 5,303,935 A | 4/1994 | Saksun |
| 5,335,921 A | 8/1994 | Orlowski |
| 5,378,000 A | 1/1995 | Orlowski |
| 5,470,157 A | 11/1995 | Dougherty et al. |
| 5,480,161 A | 1/1996 | Borowski |
| 5,498,006 A | 3/1996 | Orlowski |
| 5,655,781 A | 8/1997 | Petrak |
| 5,664,791 A | 9/1997 | Owen |
| 5,683,091 A | 11/1997 | Isoe et al. |
| 5,687,972 A | 11/1997 | Petrak |
| 5,865,441 A | 2/1999 | Orlowski |
| 5,887,875 A | 3/1999 | Salciccioli et al. |
| 5,904,356 A | 5/1999 | Mundy |
| 5,908,195 A | 6/1999 | Sharrer |
| 5,951,020 A | 9/1999 | Orlowski |
| 5,951,033 A | 9/1999 | Winter et al. |
| 5,961,124 A | 10/1999 | Muller |
| 5,967,524 A | 10/1999 | Fedorovich |
| 6,003,871 A | 12/1999 | Poll |
| 6,015,153 A | 1/2000 | Sharrer |
| 6,062,568 A | 5/2000 | Orlowski et al. |
| 6,142,479 A | 11/2000 | Fedorovich |
| 6,182,972 B1 | 2/2001 | Orlowski |
| 6,213,476 B1 | 4/2001 | Chandler et al. |
| 6,234,489 B1 | 5/2001 | Orlowski et al. |
| 6,257,587 B1 | 7/2001 | Toth et al. |
| 6,311,984 B1 | 11/2001 | Orlowski |
| 6,367,807 B1 | 4/2002 | Rockwood |
| 6,386,546 B1 | 5/2002 | Fedorovich |
| 6,390,477 B1 | 5/2002 | Drago et al. |
| 6,419,233 B2 | 7/2002 | Orlowski |
| 6,450,503 B1 | 9/2002 | Dossena et al. |
| 6,471,211 B1 | 10/2002 | Garnett et al. |
| 6,471,215 B1 | 10/2002 | Drago et al. |
| 6,485,022 B1 | 11/2002 | Fedorovich |
| 7,201,377 B2 | 4/2007 | Chitren et al. |
| 7,334,942 B2 | 2/2008 | Cha et al. |
| 7,427,070 B2 | 9/2008 | Chitren et al. |
| 7,461,846 B2 * | 12/2008 | Chitren ............... F16J 15/4478 277/347 |
| 7,604,239 B2 | 10/2009 | Chitren et al. |
| 7,658,386 B2 | 2/2010 | Oldenburg |
| 7,878,508 B2 | 2/2011 | Nóbrega |
| 8,820,749 B2 * | 9/2014 | Tones ................... F16J 15/4478 277/411 |
| 9,404,584 B2 * | 8/2016 | Nobrega ............. F16J 15/4474 |
| 9,587,743 B2 * | 3/2017 | Jaskot ................. F16J 15/4476 |
| 2001/0002742 A1 | 6/2001 | Orlowski |
| 2002/0167131 A1 | 11/2002 | Orlowski et al. |
| 2003/0235354 A1 | 12/2003 | Orlowski et al. |
| 2004/0070150 A1 | 4/2004 | Chitren et al. |
| 2006/0005950 A1 | 1/2006 | Wang et al. |
| 2006/0087084 A1 * | 4/2006 | Chitren ................ F16J 15/4474 277/411 |
| 2007/0013142 A1 * | 1/2007 | Chitren ................ F16J 15/4478 277/411 |
| 2007/0145690 A1 * | 6/2007 | Chitren ................ F16J 15/4474 277/411 |
| 2008/0001362 A1 * | 1/2008 | Chitren ................ F16J 15/4474 277/347 |
| 2009/0127795 A1 | 5/2009 | Lattime et al. |
| 2010/0201075 A1 | 8/2010 | Roddis et al. |
| 2010/0225065 A1 * | 9/2010 | Nobrega ............... F04D 29/106 277/418 |
| 2011/0109047 A1 * | 5/2011 | Tones ................... F16J 15/3244 277/412 |
| 2013/0033139 A1 * | 2/2013 | Tones ..................... H02K 5/124 310/90 |
| 2014/0333031 A1 * | 11/2014 | Tones ................... F16J 15/3244 277/412 |

FOREIGN PATENT DOCUMENTS

| | | |
|---|---|---|
| GB | 1026714 | 4/1966 |
| JP | 62228760 | 10/1987 |
| JP | 11108202 A | 4/1999 |
| WO | 1995032376 A1 | 11/1995 |
| WO | 2006005950 A2 | 1/2006 |
| WO | 2008116884 A1 | 10/2008 |

OTHER PUBLICATIONS

Written Opinion for PCT Application No. PCT/US2010/056364, dated Jul. 26, 2011, 4 pages.

* cited by examiner

FLOODED METALLIC BEARING ISOLATOR

CROSS-REFERENCE TO RELATED APPLICATIONS

The present application claims priority to U.S. Provisional Patent Application No. 62/490,472, filed Apr. 26, 2017, the entirety of which is hereby incorporated by reference.

TECHNICAL FIELD

The present application relates to flooded metallic bearing isolators, and more specifically to flooded metallic bearing isolators capable of retaining flooded levels of lubricant in a housing and preventing external contamination ingress into the bearing, and which eliminate the need for traditional ground plunge running surfaces on the shaft.

BACKGROUND

Labyrinth sealing devices provide a minimal drag/dynamic seal between a rotating shaft and a bearing housing. However, traditional non-contact seals do not function properly if the housing is flooded above the bottom of the shaft with oil or other media. Traditional devices also typically require a plunge ground running surface on the shaft for operation. Accordingly, a need exists for a bearing isolator capable of operating under flooded conditions and/or which eliminates that need for a traditional ground plunge running surface.

SUMMARY

This Summary is provided to introduce a selection of concepts in a simplified form that are further described below in the Detailed Description. This Summary, and the foregoing Background, is not intended to identify key aspects or essential steps of the claimed subject matter. Moreover, this Summary is not intended for use as an aid in determining the scope of the claimed subject matter.

Described herein are various embodiments of a flooded metallic bearing isolator suitable for use as a seal between a rotating shaft and a bearing housing. In some embodiments, the bearing isolator includes at least four components: a rotor, a stator, a unitizing element, and a sealing element. The stator generally engages the bearing housing and the rotor generally engages the rotating shaft. The unitizing element holds the rotor and stator together while also preventing the two components from contacting each other to thereby prevent metal to metal contact. The sealing element may include a lip seal that rides against the plunge ground outer radial surface of the rotor.

BRIEF DESCRIPTION OF THE DRAWINGS

Non-limiting and non-exhaustive embodiments of the disclosed bearing isolator, including the preferred embodiment, are described with reference to the following figures, wherein like reference numerals refer to like parts throughout the various views, unless otherwise specified.

DETAILED DESCRIPTION

Embodiments are described more fully below with reference to the accompanying Figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following Detailed Description is, therefore, not to be taken in a limiting sense.

Figure 1:
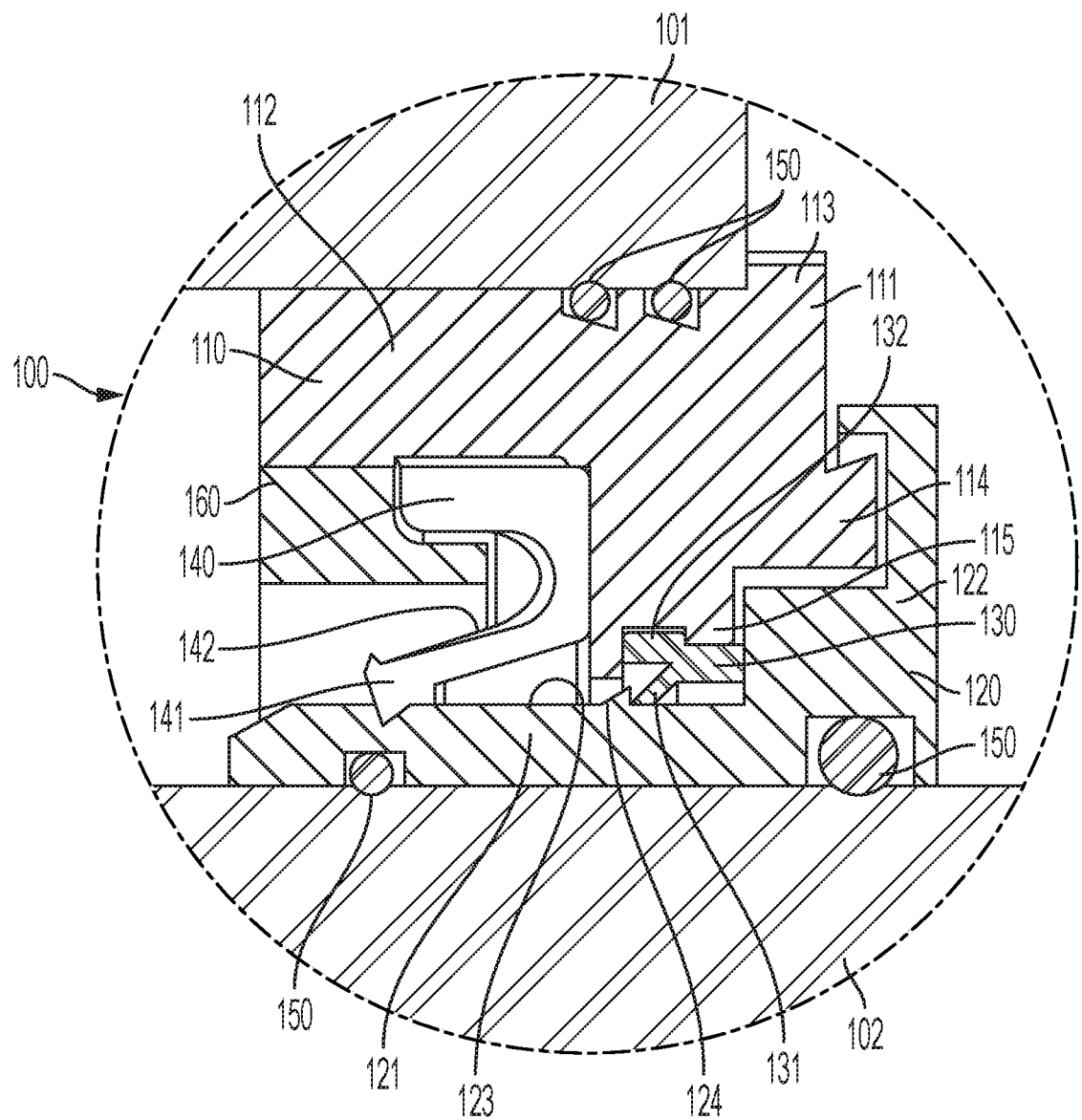
FIG. 1 illustrates a cross-section view of a bearing isolator positioned between a bearing housing and a rotating shaft according to various embodiments described herein.
Figure 2:
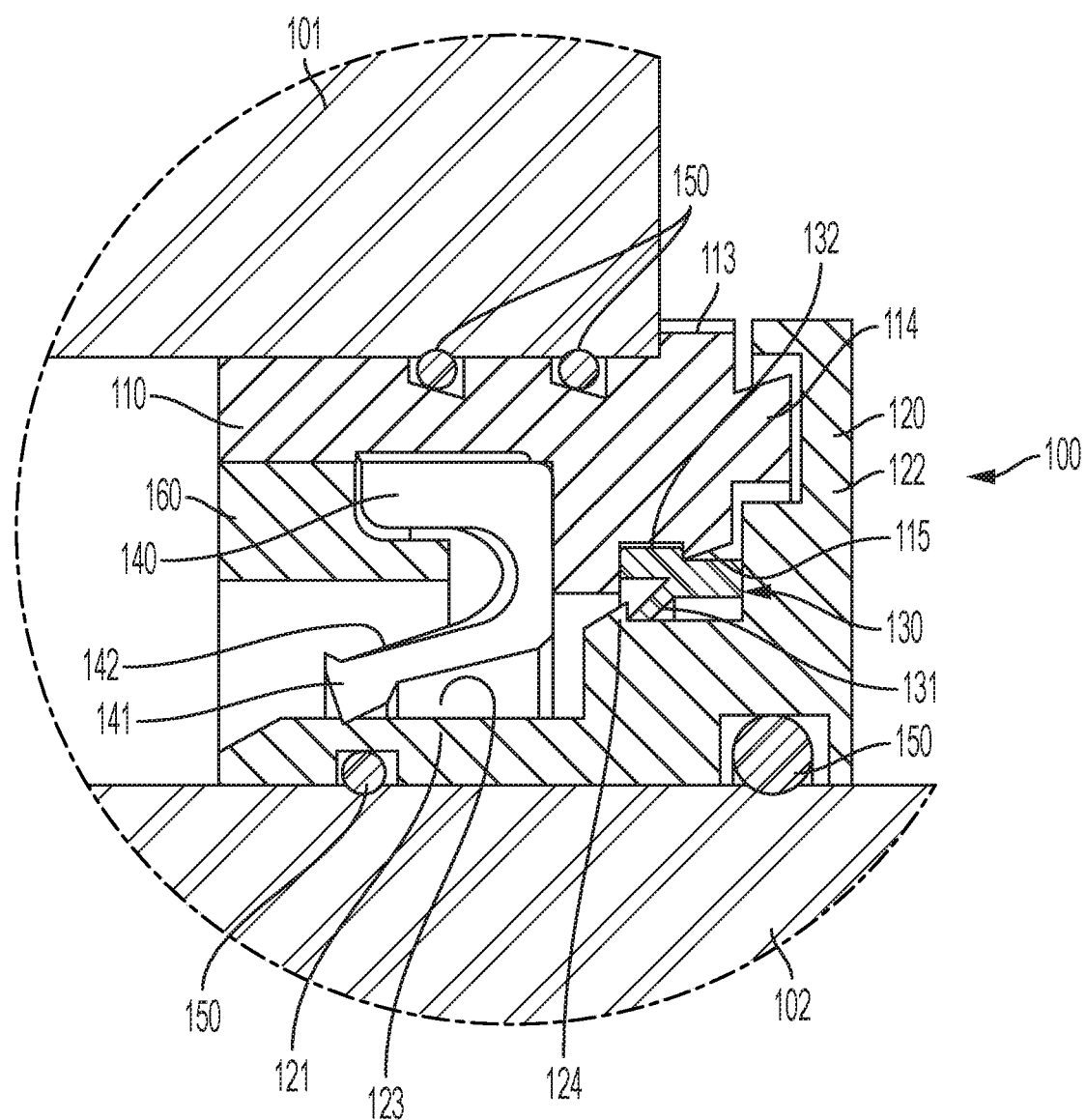
FIG. 2 illustrates a cross-section view of a bearing isolator positioned between a bearing housing and a rotating shaft according to various embodiments described herein

With reference to FIGS. 1 and 2, various embodiments of a bearing isolator 100 are shown. FIGS. 1 and 2 generally show a similar design for the bearing isolator 100, with slight differences in the dimensions of various parts of the components of the bearing isolator 100 and with the unitizing element 130 being closer to the shaft 102 in the design shown in FIG. 1 as compared to the design shown in FIG. 2. For the sake of simplicity, the two figures will be described together.

The bearing isolator 100 is generally located between a bearing housing 101 and a rotating shaft 102. For the sake of describing the bearing isolator described 100 shown in FIGS. 1 and 2, the axial direction is to the left and right of the Figures while the radial direction is to the top and bottom of the Figures. Additionally, the radial inner side is towards the bottom of the Figures and the radial outer side is towards the top of the Figures.

The bearing isolator 100 generally includes at least four components: a stator 110, a rotor 120, a unitizing element 130, and a sealing element 140. When installed, the stator 110 engages (e.g., rides against) the bearing housing 101 and the rotor 120 engages (e.g., rides against) the shaft 102. The unitizing element 130 is positioned between the stator 110 and rotor 120 and is designed to keep the stator 110 and rotor 120 together while also maintaining a space between the two elements to prevent contact between the two elements and maintain a labyrinth path. The sealing element 140 resides against the stator 110 and includes a lip seal 141 that is biased in a radial inner direction so as to continuously press against the rotor 120 and affect a seal. The bearing isolator 100 may also include one or more O-rings 150 and/or an element retainer 160 as shown in FIGS. 1 and 2.

With specific reference to stator 110, the stator 110 generally includes a base portion 111 and an axially-projecting portion 112. The axially-projecting portion 112 includes a radially outer surface that resides against the bearing housing 101. A right angle is formed where the radial inner surface of the axially projecting portion 112 intersects the base portion 111, with this right angle serving as the engagement portion for the sealing element 140.

The stator 110 may further include various protrusions and recesses to serve various purposes. For example, radially outward projection 113 is provided at one axial end of the stator 110 so that the stator 110 can better mate with a corner of the bearing housing 101 and prevent one-way axial movement of the stator 110 (i.e., movement of the stator in an axial direction to the left in FIGS. 1 and 2). Axial projection 114 at the one axial end of stator 110 helps to create a labyrinth path between the stator 110 and rotor 120 to prevent contaminants from crossing through the bearing isolator 110.

The stator 110 also includes a unitizing element surface 115 at the radially inner side of the base portion 111 of the stator 110, with the specific configuration of the surface 115 provided to create, together with the corresponding portion of the rotor 120, a cavity in which the unitizing element 130 is disposed. The unitizing element surface 115 is provided with recesses and/or protrusions that engage with the unitizing element 130 in a manner that ensures the unitizing element 130 keeps the stator 110 and rotor 120 together while also maintaining a distance between the two elements.

The stator 110 may also include various recesses for housing O-rings 150 as shown in FIGS. 1 and 2. For example, as shown in FIGS. 1 and 2, the stator 110 includes two recesses in the radial outer surface in which O-rings 150 are disposed. The O-rings 150 can be provided to improve the seal between the stator 110 and the housing 101.

With specific reference to the rotor 120, the rotor 120 generally includes an axially-projecting portion 121 and a radially outward-projecting portion 122 such that the rotor 120 has an overall L-shape. The radially inner surface of the axially-projecting portion 121 resides against the shaft 102. The radially outer surface of the axially-projecting portion 121 provides a running surface 123. In some embodiments, this running surface 123 is plunge ground to 10 to 20 pin to create an ideal running surface for the lip seal 141 of the sealing element 140. This feature eliminates the need for costly repairs to old equipment (where traditional lip seals and contamination have grooved the shaft surface) and the need for sleeving damaged shaft surfaces.

The right angle formed at the intersection of the radially outer surface of axially-projecting portion 121 and radially outward-projecting portion 122 forms a portion of the boundaries of the cavity in which the unitizing element 130 is disposed. As shown in FIGS. 1 and 2, this portion of the rotor (i.e., the right angle intersection of portions 121 and 122) may include one or more protrusions, such as protrusion 124, that help keep the rotor 120 and stator 110 together. For example, protrusion 124 (together with square portion 132 described in greater detail below) prevents the rotor 120 from moving away from the stator 110 in an axial direction to the right in FIGS. 1 and 2.

The radially outward-projecting portion 122 may be shaped and configured to form a labyrinth path with, for example, axial projection 114. As shown in FIGS. 1 and 2, this includes a surface that generally follows the contours of axial projection 114, including an axially projecting portion at the radial outer side of the outward-projecting portion 122 that extends back towards the base portion 110 so as to extend over a portion of the axial projection 114.

The rotor 120 may include various recesses for receiving O-rings as shown in FIGS. 1 and 2. For example, as shown in FIGS. 1 and 2, the rotor 120 includes two recesses in the radial inner surface in which O-rings 150 are disposed. The O-rings 150 can be provided to improve the seal between the rotor 120 and the shaft 102.

The rotor 120 and stator 110 may be made of any suitable material. In some embodiments, the rotor 120 and stator 110 are made of a metal material suitable for use in bearing isolators. In some embodiments, the same metal material is used for both components, while in other embodiments, a different metal material is used for each component.

With specific reference to the unitizing element 130, the unitizing element 130 has a configuration that, when engaged in the cavity formed by the stator 110 and rotor 120, keeps the stator 110 and rotor 120 together and also maintains a distance between the two elements in the case of axial movement to thereby prevent metal to metal contact. The unitizing element 130 may include a protrusion 131 that engages the protrusion 124 of the rotor 120, and a square portion 132 that fits in a recess of the unitizing element surface 115 of the stator 110 to help keep the stator 110 and rotor 120 together in the axial direction. In some embodiments, the unitizing element 130 is made from PTFE, though other suitable materials may also be used.

With specific reference to sealing element 140, the sealing element 140 mates with the right angle of the stator 110 described previously and includes a lip seal 141 that protrudes radially inwardly and axially away from the radially outwardly-projecting portion 122 of the rotor 120. The lip seal 141 engages with the running surface 123 of the rotor 120. In some embodiments, a spring 142 is provided in the sealing element 140 to press the lip seal 141 against the running surface 123 and thereby prevent lubrication in the housing from migrating through the seal. Alternatively or in combination with the spring 142, the lip seal 141 may be shaped and configured to be biased against the running surface 123 such that the lip seal 141 pushes against the running surface 123 even in the absence of spring 142. In some embodiments, the sealing element 140 is an elastomeric sealing element, and may be a high-performance sealing element, though other suitable materials can also be used.

Benefits of the bearing isolator described herein can include one or more of the following: retains flooded level of lubricant in housing; prevents external contamination ingress into the bearing; does not require traditional plunge ground running surface on the shaft, as running surface is included in seal assembly. The bearing isolator described herein can also provide thermal stability (from the use of metallic stator), the use of high performance elastomers for the sealing element, and increased misalignment capabilities.

From the foregoing, it will be appreciated that specific embodiments of the invention have been described herein for purposes of illustration, but that various modifications may be made without deviating from the scope of the invention. Accordingly, the invention is not limited except as by the appended claims.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended.

Unless otherwise indicated, all number or expressions, such as those expressing dimensions, physical characteristics, etc., used in the specification (other than the claims) are understood as modified in all instances by the term "approximately". At the very least, and not as an attempt to limit the application of the doctrine of equivalents to the claims, each numerical parameter recited in the specification or claims which is modified by the term "approximately" should at least be construed in light of the number of recited significant digits and by applying rounding techniques. Moreover, all ranges disclosed herein are to be understood to encompass and provide support for claims that recite any and all sub-ranges or any and all individual values subsumed therein. For example, a stated range of 1 to 10 should be considered to include and provide support for claims that recite any and all sub-ranges or individual values that are between and/or inclusive of the minimum value of 1 and the maximum value of 10; that is, all sub-ranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

We claim:
1. A bearing isolator comprising:
a unitizing element comprising:
   a square portion extending in a radially outward direction; and
   a protrusion extending in a radially inward direction;
a stator comprising:
   a base portion comprising:
      a unitizing element surface configured to define a portion of a unitizing element cavity in which the unitizing element resides, the unitizing element surface comprising:
         a recess extending in a radially outward direction and configured to receive the square portion of the unitizing element; and
         an axially-oriented portion, wherein a radial inner surface of the axially oriented portion forms a right angle with a surface of the base portion;
a rotor comprising:
   a radially oriented section; and
   an axially oriented section comprising:
      a unitizing element surface configured to define another portion of the unitizing element cavity, the unitizing element surface comprising:
         a protrusion extending in a radially outward direction and configured to engage the protrusion of the unitizing element; and
      a running surface; and
a sealing element residing against the right angle, the sealing element comprising:
   a lip seal extending in a radially inner direction and pressing against the running surface of the axially oriented section of the rotor.

* * * * *